2 Sheets—Sheet 1.

H. TABER.
CLAPBOARD SAWING MACHINE.

No. 279,287. Patented June 12, 1883.

Witnesses:
Edwin G. Asmus
Charles R. Hunter

Inventor:
Horace Taber
per S. S. Stout
Attorney

2 Sheets—Sheet 2.

H. TABER.
CLAPBOARD SAWING MACHINE.

No. 279,287. Patented June 12, 1883.

Witnesses:
Edwin G. Asmus.
Charles R. Hunter.

Inventor:
Horace Taber
per S. S. Stout
Attorney

N. PETERS, Photo-Lithographer, Washington, D. C.

UNITED STATES PATENT OFFICE.

HORACE TABER, OF MANISTEE, MICHIGAN.

CLAPBOARD-SAWING MACHINE.

SPECIFICATION forming part of Letters Patent No. 279,287, dated June 12, 1883.

Application filed October 7, 1879.

*To all whom it may concern:*

Be it known that I, HORACE TABER, of Manistee, in the county of Manistee, and in the State of Michigan, have invented certain new and useful Improvements in Siding or Clapboard Machines; and I do hereby declare that the following is a full, clear, and exact description thereof.

My invention relates to devices for dividing logs into sidings or clapboards; and it consists in a head-block of peculiar construction, in combination with saws, arranged as will hereinafter be fully described.

Figure 1:
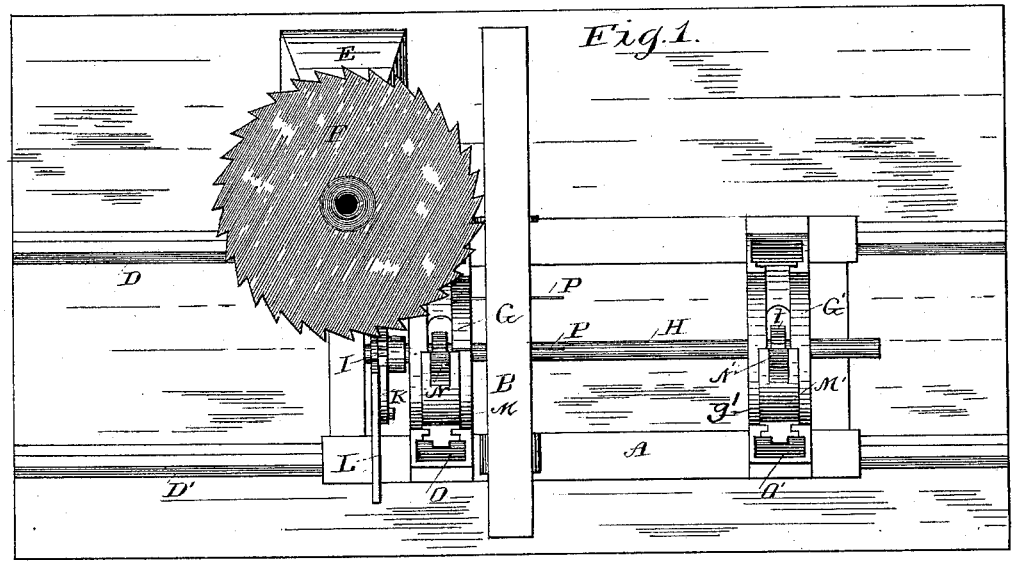
Figure 2:
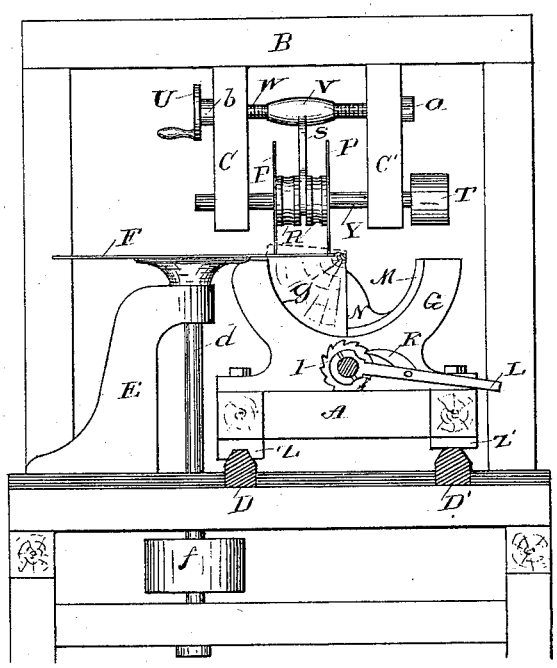
Figure 3:
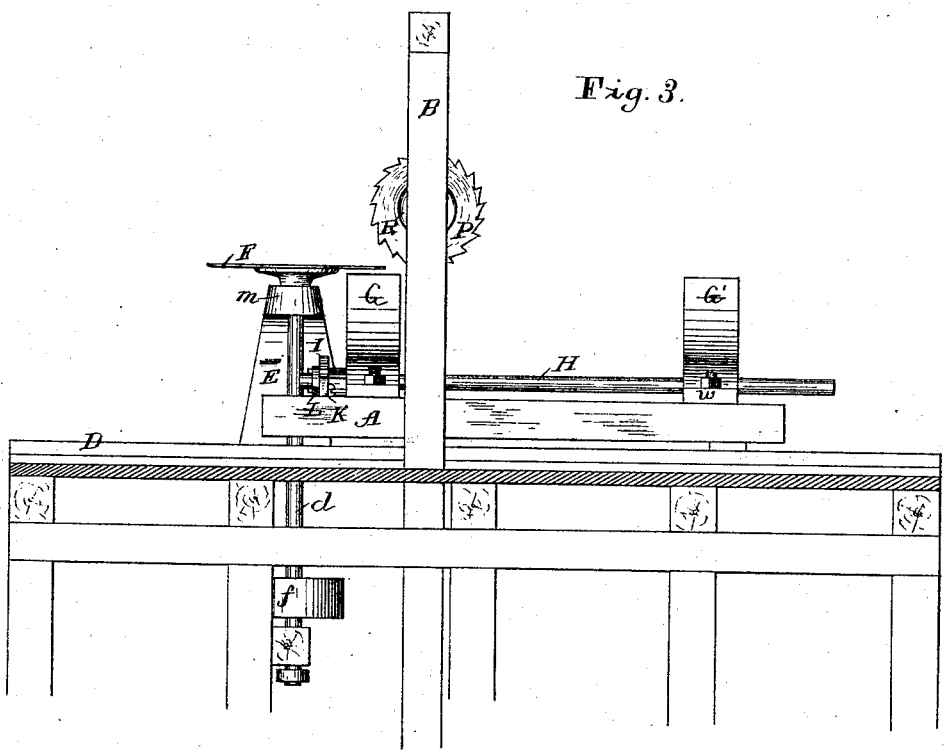
Figure 4:
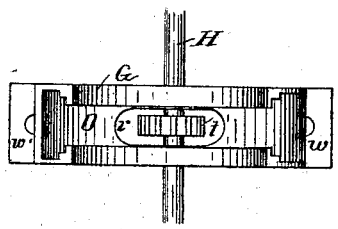
Figure 5:
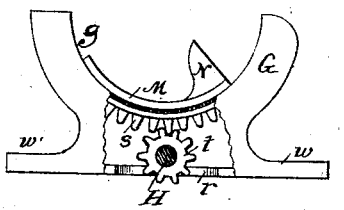

In the drawings, Figure 1 represents a plan view of my invention; Fig. 2, an end view; Fig. 3, a side view, and Figs. 4 and 5 details.

A is the head-block carriage, mounted on suitable ways, D D'.

B is a frame, from which are suspended hangers C C', through which the shaft carrying the saws P P is passed.

E is a bracket for sustaining the arbor of the saw F.

G G' are head-blocks, which have curved beds g g' for the cant or log to rest in; and these beds are grooved, as shown at O O', for accommodating the bases of the knees or jack-heads M M', which may also, but not necessarily, be curved; and I provide these knees or jack-heads with faces N N', which point to the center of a circle of which the curve of the beds is an arc, and have cogs s on their under sides for engagement with pinions t on the setting-shaft H.

The saws P P are splined or otherwise attached to the shaft Y, which slides loosely in its bearings, and is revolved by a pulley, T.

Just above the saws P P, I arrange a screw-shaft, W, which passes through and supports a bracket, V S, the lower end of which is bifurcated and fits in a groove in the saw-collars.

Operation: Having placed a quarter of a log upon the head-block, as shown in the drawings, and adjusted the knees or jack-heads M M' so that their faces will hold the quarter in the proper position, the carriage is started in the direction of the saws. As it comes in contact with the saws P P it is grooved near its "sap" and heart, and in its further progress it meets the larger saw, F, which, entering it, makes a radial cut, and, extending beyond the groove made by the inner saw P, takes off a siding or clapboard clear through the entire length of the quarter. The carriage is then returned, and the knees or jack-heads elevated by the ratchet-lever L for another cut. This is repeated until the entire quarter is consumed, each adjustment of the knees or jack-heads carrying the quarter into a proper position for a radial cut.

Instead of two saws P P, only one may be used, as it may not be necessary in some cases to take off both edges at once; or when two are retained on the shaft they may be made adjustable with relation to each other.

The sidings or clapboards made by my machine are of uniform size and taper, are invariably on the same grain of the wood, and are not liable to warp out of shape.

Having thus described my invention, what I claim therein is—

1. A head-block having curved bed, in combination with a knee or jack-head having a face pointing to the center of a circle of which the curve of the bed of the head-block is an arc, and a setting device whereby the cant or quarter is presented to the saw F in such a position that the cuts made thereby will lead to a common center for producing sidings or clapboards, as set forth.

2. The combination of a head-block having a curved bed and a jack or knee having a curved base arranged radially to the curved bed, substantially as and for the purpose specified.

3. A head-block having a curved bed and knee or jack-head adapted thereto for supporting a cant and carrying it about a fixed center, in combination with the saw F, arranged to produce a radial cut, as shown, and one or more edging-saws, P P, mounted on a separate arbor and at an angle to the saw F, substantially as shown and described.

4. In a clapboard-machine, the combination of a carriage so constructed, substantially as described, as to move the log or cant about a center and present it to the saw in such manner as to produce radial cuts therein, a slicing-saw, and two edging-saws arranged at right angles to the slicing-saw, whereby the wedge-shaped board is freed from the heart and sap edges simultaneously and while rigidly attached to the cant, substantially as specified.

5. As an improvement in the art of forming siding, the method herein described, consisting in severing a wedge-shaped longitudinal section from a cant by a radial cut and simultaneously freeing the wedge-shaped section from the heart and sap edges by two longitudinal cuts made parallel to each other and to the axis of the cant during the time the wedge-shaped section is held by the cant, substantially as specified.

In testimony that I claim the foregoing I have hereunto set my hand this 2d day of October, 1879.

HORACE TABER.

Witnesses:
STANLEY S. STOUT,
ALBERT CUNNINGHAM.